United States Patent [19]
Camm et al.

[11] 3,859,346

[45] Jan. 7, 1975

[54] PRODUCTION OF CARBOXYLIC ACIDS

[75] Inventors: Richard John Camm; Howard Stanton Green, both of Keyingham, England

[73] Assignee: BP Chemicals International Limited, London, England

[22] Filed: Sept. 15, 1972

[21] Appl. No.: 289,311

[30] Foreign Application Priority Data
Sept. 15, 1972  Great Britain.................... 42970/72

[52] U.S. Cl. .......................... 260/533 R, 260/597 R
[51] Int. Cl. ...................... C07c 51/20, C07c 53/08
[58] Field of Search .............................. 260/533 R

[56] References Cited
UNITED STATES PATENTS

| | | | |
|---|---|---|---|
| 2,800,504 | 7/1957 | Elce et al. ........................ | 260/533 R |
| 3,555,083 | 1/1971 | Nakamura....................... | 260/533 R |

FOREIGN PATENTS OR APPLICATIONS

| | | | |
|---|---|---|---|
| 743,991 | 1/1956 | Great Britain .................. | 260/533 R |
| 1,020,797 | 2/1966 | Great Britain .................. | 260/533 R |

*Primary Examiner*—Lorraine A. Weinberger
*Assistant Examiner*—Richard D. Kelly
*Attorney, Agent, or Firm*—Brooks, Haidt & Haffner

[57] ABSTRACT $C_4 - C_8$ paraffins are oxidized in the liquid phase with molecular oxygen in a reactor in which manganese content is maintained in the range of 2 to 50 ppm.

9 Claims, No Drawings

PRODUCTION OF CARBOXYLIC ACIDS

The present invention relates to the oxidation of lower paraffins with molecular oxygen to give lower carboxylic acids.

The liquid phase oxidation of lower paraffins e.g. paraffins having from four to eight carbon atoms with molecular oxygen at elevated temperatures is disclosed in British Pat. Specifications Nos. 743,989 743,990 and 771,992. The products produced by this process may be classified as (a) volatile non-acidic oxidation products of boiling point up to 99° C in the presence of water, hereinafter referred to as "low boilers" or "light ends," (b) water, (c) aliphatic mono carboxylic acids of one to four carbon atoms and (d) higher boiling materials, including higher acids.

The oxidation of $C_4 - C_8$ hydrocarbons with molecular oxygen gives a mixture of lower carboxylic acids including formic and acetic. It is desirable to be able to change the relative amounts of acids made and to be able to increase the quantity of acetic acid made relative to other acids. It has now been found that by carrying out oxidation of $C_4 - C_8$ paraffins with molecular oxygen in the presence of much smaller quantities of manganese than were used previously improved selectivities of acetic acid on oxygen reacted are obtained.

According to the present invention the process for the production of lower carboyxlic acids comprises oxidizing a hydrocarbon feedstock comprising at least one paraffin having four to eight carbon atoms in the molecule in the liquid phase with molecular oxygen at elevated temperature in a reactor wherein a manganese compound is fed to the reactor to maintain a manganese content within the reactor within the range 2 to 50 parts per million of manganese based on total weight of reaction mixture in the reactor.

The hydrocarbon feedstock used in the process of the present invention is a paraffinic hydrocarbon having from four to eight carbon atoms in the molecule preferably five to seven carbon atoms in the molecule. Substantially pure paraffins or paraffinic fractions which may also contain aromatic hydrocarbons may be used. The paraffin may be a straight chain paraffin alone or in admixture with branched chain paraffins. Any branched chain paraffins present in the feed to the process are preferably paraffins having 1 or more methyl groups. Where the feed for the process is a fraction it is preferably one boiling at a temperature not exceeding 100° C. Desirably the boiling range of the fraction is 15° C to 95° C.

Suitable feedstocks which may be used are straight chain petroleum fractions; the products from the isomerisation of predominantly straight chain paraffins of four to eight carbon atoms by aluminium chloride or from other isomerisation processes known to the art; the products obtained by the alkylation of $C_2$ to $C_4$ olefins with isoparaffins; or alternatively the product obtained by hydrogenation of the mono-olefins produced by dimerisation of lower olefins such as propylene and isobutene. An example of a cheap commercially available paraffinic hydrocarbon feedstock suitable for the process of the invention is a straight run gasoline fraction from a Middle East petroleum having a boiling range of from about 15° to 95° C.

The molecule oxygen may be fed to the reaction in the form for example of air or mixtures of gas richer or poorer in molecular oxygen than air.

The pressure used in the oxidation should be such as may be necessary to maintain the reactants substantially in the liquid phase. Examples of suitable temperatures for the oxidation reaction are those in the range 150° to 250° C. It is preferred to operate the process in such a manner that substantially all the oxygen fed is absorbed. Thus the concentration of oxygen in the gas leaving the reactor is preferably maintained at not more than 1% wt/wt. The desired rate of absorption may be obtained by adjusting the reaction temperature. This may be done by varying the amount of heat removed from the reactor for example by varying the quantity of heat exchange medium passed through coils in the reactor.

The oxidation reaction may be carried out in any of the known types of apparatus in which molecular oxygen is intimately contacted with liquid feed. An example of a suitable form of apparatus is a vertical tower with an internal vertical draught tube open at either end. Gas is introduced into the reactor near the base and the mixture of gas and liquid rises till it is level with the top of the draught tube. The gas disengages from the liquid and the liquid descends through the draught tube to the base of the reactor where the cycle is repeated.

The manganese content within the reactor is maintained within the range 2 to 50 parts per million by weight based on the weight of reaction mixture in the reactor preferably 2 – 30 ppm, more preferably 10 to 20 parts per million. It is not intended to be bound by any particular theory as to the mode of operation of the manganese or to imply that the manganese fed to the reactor is necessarily present in solution within the reactor. The manganese content is maintained at the desired level by measuring the volume of liquid product withdrawn from the reactor and adjusting the quantity of manganese compound fed to the reactor to make up for that lost from the reactor in the liquid product on the assumption that the manganese content of the liquid product withdrawn is the same as that inside the reactor and that no manganese is deposited inside the reactor. The manganese compound may be fed to the reactor continuously to maintain the manganese content at the desired level. The quantity of manganese fed will depend upon the rate at which manganese is lost from the reactor which will in turn depend upon whether the reaction product is recovered from the reactor as a vapour, as a liquid or as a mixture of both. The manganese compound is preferably a manganese salt. The manganese compound is conveniently a hydrocarbon-soluble compound of manganese. Examples of suitable manganese compounds are manganese salts of carboxylic acids e.g. manganese naphthenate. Alternatively the manganese compound may be fed in the form of an aqueous solution for example manganese acetate.

The use of manganese gives particularly good results in combination with the use of high rates of recycle of "light ends" (defined above) to the reactor. The use of high rates of recycle of "light ends" to the reactor is disclosed in British Patent Specification No. 1,268,129. When operating with high "light ends" recycle rates the weight ratio of "light ends," recovered from the reaction product and recycled to the reaction, to oxygen reacted is preferably greater than 1.6:1 and is more preferably within the range 2:1 to 4:1.

The reaction product may be recovered from the reactor and worked up to give acetic acid and other lower carboxylic acids in any convenient manner. Thus the reaction product may be recovered from the reactor as a liquid stream, which is distilled to remove the low boiling residues or "light ends" overhead. The residue from this distillation may be subjected to further distillation to recover water and lower carboxylic acids overhead, leaving higher boiling materials as residue. The mixture of water and lower carboxylic acids is then subjected to further distillation to remove water and to recover formic, acetic and propionic acids, and if desired butyric acid. Suitable methods of distillation are well known in the art.

It is possible to operate the recovery stages so as to recover only carboxylic acids. The "light ends" however contain acetone which may be recovered before the light ends are recyled to the oxidation reaction process.

The invention will now be described with reference to the following Examples.

EXAMPLE A

This is a comparative example not according to the invention. The apparatus used comprised a 5ft. × 4 in. diameter stainless steel cylindrical reactor fitted with an internal draught tube to promote liquid circulation and heated by means of an oil jacket. The paraffin feed was a straight run gasoline fraction having a boiling range of from about 15° to 95° C. All feed and recycle streams were fed at the base of the reactor. Air was introduced at the base of the reactor through a sparge ring. Liquid products were withdrawn from the base through a pressure reducing valve. Organic vapours issuing from the head of the reactor were condensed and returned. Waste gases were vented to atmosphere. The liquid product from the base of the reactor was fed to a fractional distillation column. This was a packed glass column operated at atmospheric pressure. The base of the column was maintained at a temperature of 107° C. Low boiling materials (i.e., materials boiling at temperatures up to 99° C in the presence of water) or "light ends" were removed overhead, some being returned to the column as reflux, the rest being returned to the reactor. These low boiling materials recovered from the initial distillation of the reaction product are sometimes referred to as "Primary Light Ends" (PLE) because sometimes other low boiling materials may be recovered at a later stage of distillation. The product from the base of the column was subjected to further distillation to recover formic acetic and propionic acids. An experiment was carried out using the apparatus described above. Manganese was not fed to the reactor and tests indicated that if any manganese was present it constituted less than 1 part per million by weight of the reaction mixture. The conditions used and the results obtained are given in Table 1 under Example A. The selectivity on oxygen is the weight of product made divided by oxygen consumed, expressed as a percentage. The oxygen absorbed is measured in kilograms per hour per litre of liquid in the reactor.

EXAMPLE 1

An experiment was carried out using the same pressure, oxygen feed rate and primary light ends to oxygen reacted ratio as Example A, but with manganese naphthenate fed as a solution in the hydrocarbon feed at a rate to give a manganese content of the reactor contents of 10 ppm. The conditions used and the results obtained are given in Table 1 under Example 1.

EXAMPLE B

This is a comparative Example not according to the invention. The reaction was carried out as in Example A except that a high ratio of primary light ends recycled to oxygen reacted (or absorbed) was used. The conditions used and the results obtained are given in Table 2 under Example B.

EXAMPLE 2

An experiment was carried out as in Example B except that manganese naphthenate was fed as in Example 1. This time a manganese content of the reactor was maintained at 20 parts per million. The conditions used and the results obtained are given in Table 2 under Example 2.

EXAMPLE C

This is a comparative Example not according to the invention.

The apparatus used was a cylindrical stainless steel reactor, whose height and internal diameter were in the ratio 32:1. This was fitted with an internal draught tube to promote liquid circulation, air being introduced into the base of the reactor through a sparge ring. The reactor was fitted with internal heat exchange coils. Steam was passed through the coils to heat the reactor contents to the desired reaction temperature. When reaction started the heat produced was removed by generating steam in the coils. The temperature was controlled to keep the oxygen content in the gas leaving the reactor at or below 1% wt/wt. All feed and recycle streams were fed to the top of the draught tube. The paraffin feed used was a straight run gasoline fraction having a boiling range of from 15° to 95° C. Organic vapours issuing from the head of the reactor were condensed and returned. Waste gases were vented to atmosphere. The reactor product was removed from the reactor and distilled in the same way as Example A, except that the distillation column was a stainless steel column with 24 sieve trays, and the low boilers ("light ends") were subjected to distillation to recover acetone at a fixed rate equivalent to 9% wt/wt selectivity on oxygen reacted, before being returned to the reactor.

An experiment was carried out using the apparatus described above, using the conditions set out in Table 3. No manganese was fed to the reactor.

TABLE 3

| Example | C | 3 | 4 | 5 | 6 |
| --- | --- | --- | --- | --- | --- |
| Temp. (°C) | 172–178 | 170–177 | 172–180 | 174–182 | 177–183 |
| Pressure (bar) | 50 | 49 | 49 | 50 | 50 |
| Oxygen Absorption Rate Kg/h/l | 0.28 | 0.27 | 0.28 | 0.28 | 0.27 |
| PLE/O$_2$ ratio w/w | 0.7 | 0.7 | 0.7 | 0.7 | 0.7 |
| Mn content of reactor (ppm) | 0 | 2 | 10 | 20 | 50 |
| Selectivities on Oxygen (% w/w) | | | | | |
| Formic Acid | 13 | 12 | 12 | 13 | 15 |
| Acetic Acid | 44 | 45 | 47 | 48 | 47 |
| Propionic Acid | 7 | 7 | 8 | 8 | 8 |
| Acetone | 10 | 9 | 10 | 9 | 9 |

EXAMPLES 3 – 6

A series of experiments was carried out as in Example C but with manganese being fed to the reactor as an aqueous solution of the acetate. The quantities of manganese present in the reactor, the conditions used and the results obtained are given in Table 3 under Examples 3 to 6.

A comparison of Example C with Examples 3 to 6 shows the improved yield of acetic acid obtained by the addition of manganese.

TABLE 1

LOW LIGHT ENDS RECYCLE RATE

| Example | A | 1 |
|---|---|---|
| Temperature (°C) | 187 | 189 |
| Pressure (bar) | 48.3 | 48.3 |
| Air Feed (kg/h) | 9.6 | 9.6 |
| Oxygen absorbed (Kg/h/litre) | 0.26 | 0.26 |
| PLE/$O_2$ ratio (w/w) | 0.7 | 0.7 |
| Mn Content of reactor (ppm) | <1 | 10 |
| Selectivities on Oxygen % w/w | | |
| Formic Acid | 10 | 12 |
| Acetic Acid | 42 | 47 |
| Propionic Acid | 6 | 7 |

TABLE 2

HIGH LIGHT ENDS RECYCLE RATE

| Example | B | 2 |
|---|---|---|
| Temperature (°C) | 187 | 184 |
| Pressure (bar) | 48.3 | 48.3 |
| Air Feed (kg/h) | 9.5 | 9.4 |
| Oxygen absorbed (kg/h/litre) | 0.26 | 0.26 |
| PLE/$O_2$ ratio w/w | 2.2 | 2.2 |
| Mn Content of reactor (ppm) | <1 | 20 |
| Selectivity on Oxygen % w/w | | |
| Formic Acid | 18 | 18 |
| Acetic Acid | 50 | 57 |
| Propionic Acid | 10 | 11 |

We claim:

1. The process for the production of lower carboxylic acids which comprises oxidizing in the liquid phase a hydrocarbon feedstock comprising at least one paraffin having four to eight carbon atoms in the molecule with molecular oxygen at elevated temperature in the range of about 150° to 250° C in a reactor wherein a manganese compound is fed to the reactor to maintain a manganese content within the reactor within the range 2 to 50 parts per million of manganese based on total weight of reaction mixture in the reactor thereby improving the selectivity of acetic acid based on oxygen reacted.

2. The process according to claim 1 wherein the feedstock comprises at least one paraffin having from five to seven carbon atoms in the molecule.

3. The process according to claim 1 wherein the feedstock is a straight run gasoline fraction having a boiling range of 15° to 95° C.

4. The process according to claim 3 wherein the gasoline fraction is derived from a Middle East petroleum.

5. The process according to claim 1 wherein the molecular oxygen is supplied as air.

6. The process according to claim 1 wherein the manganese content is maintained within the range 2 to 30 parts per million.

7. The process according to claim 6 wherein the manganese content is maintained within the range 10 to 20 parts per million.

8. The process according to claim 1 wherein the weight ratio of light ends recycled to the reaction, to oxygen reacted is greater than 1.6:1.

9. The process according to claim 8 wherein the weight ratio of lights ends recycled to oxygen reacted is within the range 2:1 to 4:1.

* * * * *